Figure 9:
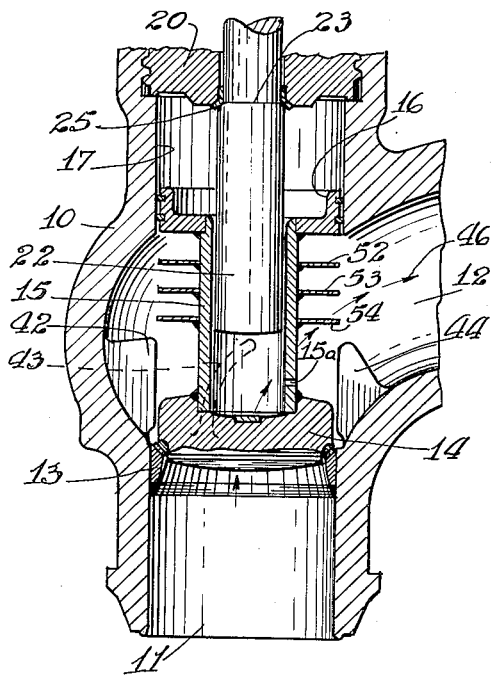

Dec. 9, 1952     D. MacGREGOR     2,621,015
VALVE CONSTRUCTION
Filed May 28, 1945     3 Sheets-Sheet 1
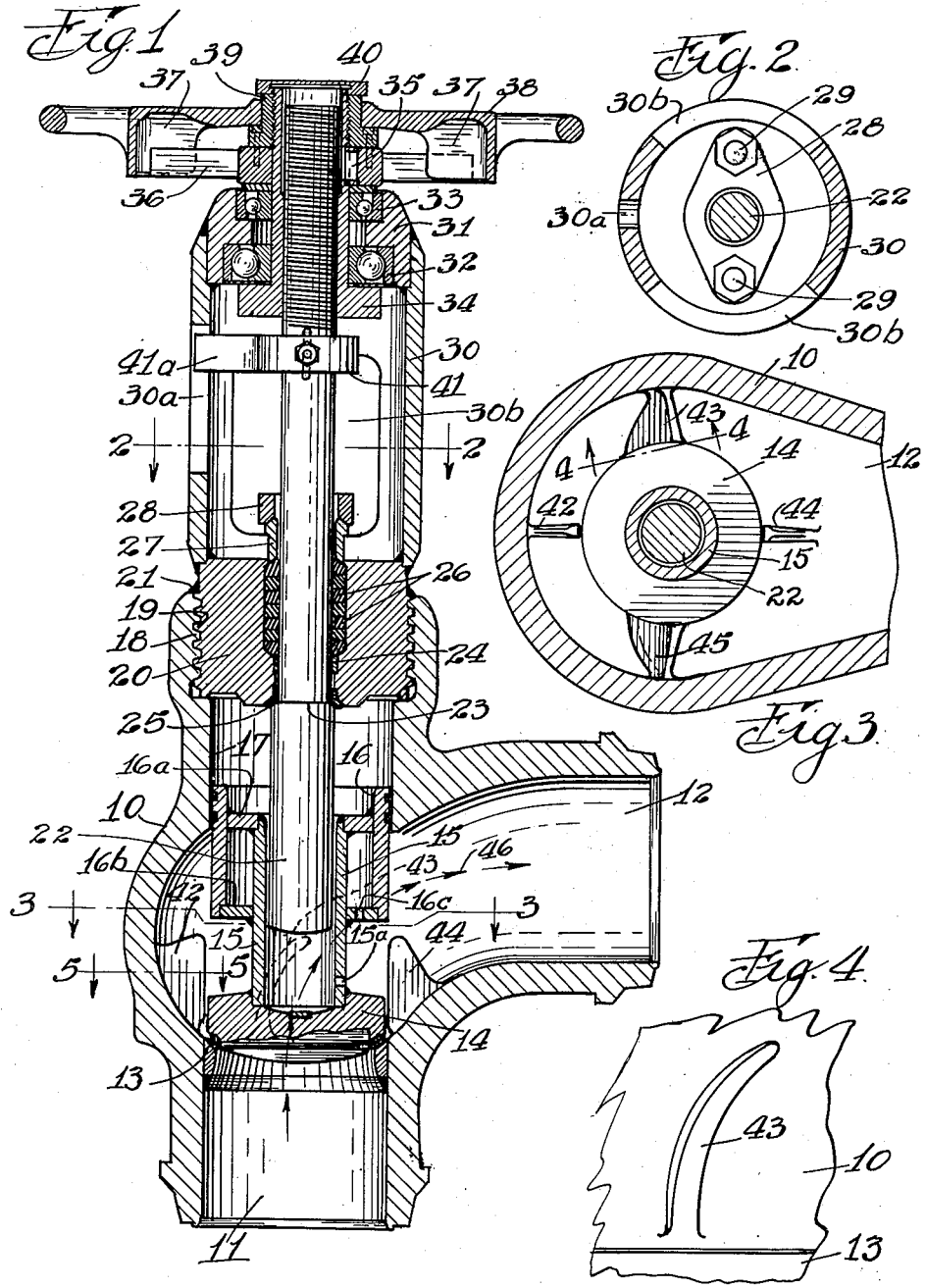
INVENTOR.
DAVID MacGREGOR
BY Albert C. Bell
ATTORNEY.

Dec. 9, 1952 — D. MacGREGOR — 2,621,015
VALVE CONSTRUCTION
Filed May 28, 1945 — 3 Sheets-Sheet 2
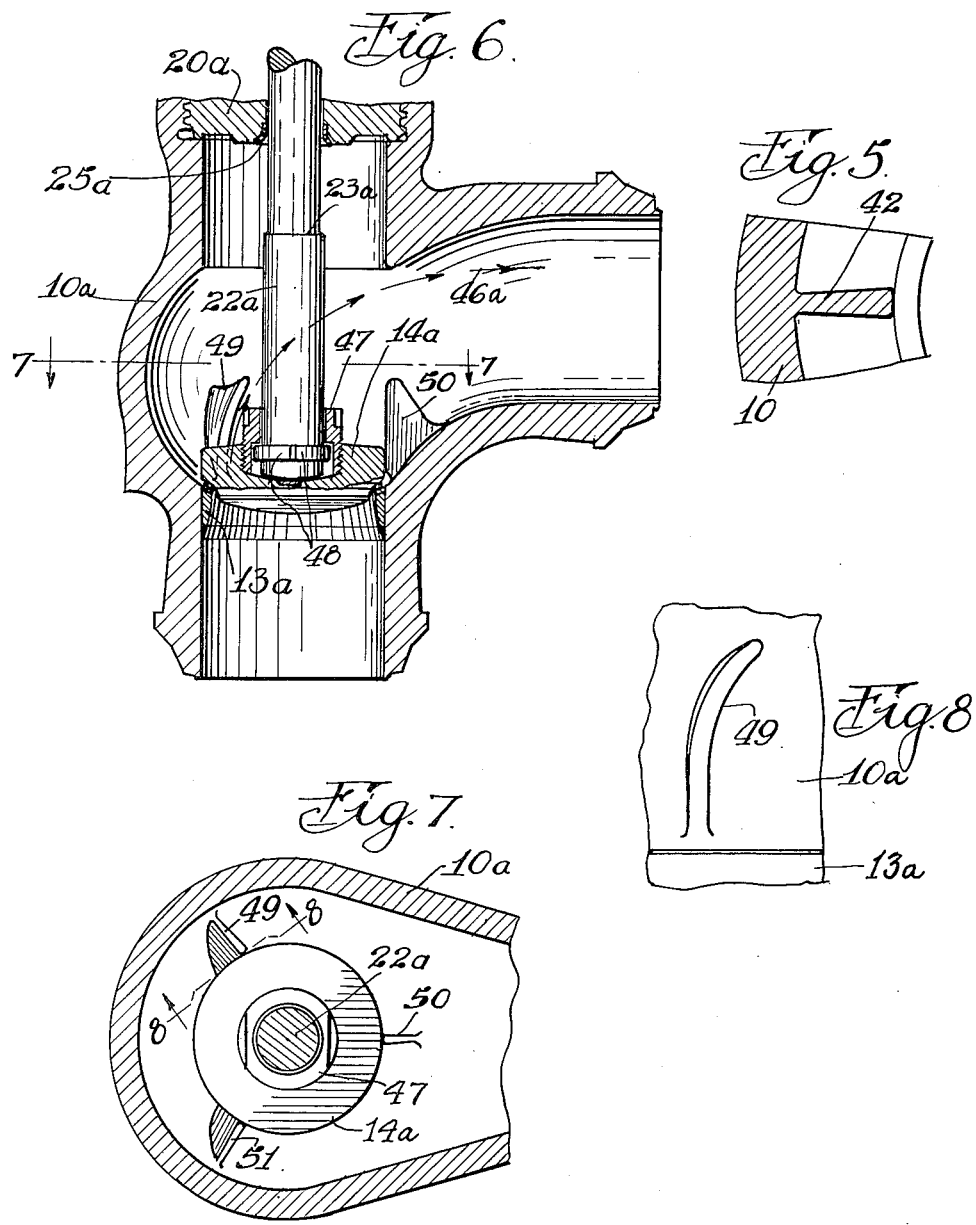
INVENTOR.
DAVID MacGREGOR
BY Albert C. Bell
ATTORNEY.

Dec. 9, 1952        D. MacGREGOR        2,621,015
VALVE CONSTRUCTION

Filed May 28, 1945                                3 Sheets-Sheet 3

INVENTOR.
DAVID MACGREGOR.
BY Albert C. Bell
ATTORNEY.

Patented Dec. 9, 1952

2,621,015

UNITED STATES PATENT OFFICE 2,621,015

VALVE CONSTRUCTION

David MacGregor, Munster, Ind., assignor to Edward Valves, Inc., a corporation of Indiana Application May 28, 1945, Serial No. 596,382

6 Claims. (Cl. 251—142)

My invention pertains to valve constructions for controlling the flow of fluid, of the type in which a valve body having inlet and outlet passages is provided with a valve seat in a plane crossing the path of fluid flow through the valve body, and in which a valve disk is mounted in the valve body, for axial movement from and towards said valve seat to control said fluid flow. Valves of this kind are frequently made in large sizes and are often required to withstand pressures of the controlled fluid, or 300 lbs. per square inch or more, as well as temperatures of 500° F. or more, and under such conditions of pressure and temperature serious problems develop which are not present to a noteworthy degree in small valves. Valves of the kind under consideration, are frequently used in power plants of large capacity, and under conditions placing a premium on maintaining as low as possible, the losses imposed on the flowing fluid by the valves, without unduly complicating the valves, and without in any way interfering with the convenient operation of the valves to accomplish their intended purposes.

With valves of the type referred to, which generally require the fluid flowing through the valve body to have a curved path of flow in passing from the valve seat to the outlet passage of said body, it has been found desirable to provide the valve body with a plurality of angularly spaced guiding ribs for the valve disk, said ribs having inner edge surfaces parallel with the axis of movement of the valve disk, said inner surfaces having guiding fit with the outside surface of the valve disk, to keep the valve disk in the proper path of movement from and towards the valve seat, and to insure accurate seating of the valve disk against the valve seat, when the valve disk is moved to its position stopping fluid flow through the valve body.

In the past it has been the practice to have the structures of said guiding ribs straight and parallel with the axis of movement of the valve disk. Such structures produce substantial back pressure on the fluid flowing through the valve body, and it is a purpose of the present invention to provide guiding ribs for valve disks of the type referred to, that produce practically no back pressure on the fluid flow, first, by forming said guiding ribs so that they have side surfaces that are shaped or curved to substantially the optimum curvature of the fluid stream at the locations of said ribs, said side surfaces serving as deflectors for the portions of the flow stream engaged thereby, to direct and keep said portions of the flow stream in paths of movement corresponding to the path of movement of the flow stream as a whole, thereby avoiding the production of eddying currents in the flow stream, and second, the guiding ribs of the invention are provided with guiding surfaces of sufficient angular extent to suitably guide the valve disk, and beginning substantially at said guiding surfaces, and proceeding towards the rib-supporting portions of the valve body and towards the upper edges of said guiding ribs, said guiding ribs are made progressively thinner so as to have a tapering cross-section, leaving only sufficient metal at the thinnest portions of the guiding ribs, to afford adequate mechanical support for said ribs, thereby acording a streamline flow of the fluid flowing through the valve seat and across said guide ribs.

It is the object of the invention to produce valve constructions of the kind described in which the total back pressure exerted on the fluid flowing through the valve body is reduced to a minimum, first, by the use of curved guiding ribs for the valve disk, as described; second, by the use of an additional and substantially flat valve disk guiding rib or ribs so located in the fluid stream that the optimum paths of flow of the fluid engaging said flat guiding rib or ribs are parallel with said rib or ribs, which flat rib or ribs direct and maintain the engaged fluid in said optimum paths of flow and tend to prevent the formation in the flow stream of cross currents and eddying currents; and third to construct the inner surfaces of the valve body and its parts engaged by the flow stream to direct the flowing fluid without abrupt change in direction and without undue obstruction, along a curved path of flow through the valve body.

Certain types of valves of the class above described, are known as check or non-return valves, and as stop and check valves, the latter differing from the former in providing means operable when desired for positively holding the valve disk normally operating as a check valve, on its seat regardless of the tendency of the fluid to flow through the valve, whereas in the plain check valve structures, the valve disk is free at all times to move from and towards its seat depending on the direction of flow or flow tendency through the valve body, said plain check valves having no devices for holding their valve disks in closed position.

In applying the invention to check valves and to stop and check valves, all of the structural features above referred to may be used, and the following further means are employed for reducing back pressure in the valve body to a minimum.

First, the inlet passage as it approaches the valve seat is given a gradually constricted diameter, so that the velocity of flow of the fluid is increased, and is a maximum at the valve seat, from which point the velocity of the flow stream is maintained substantially constant through the valve body, until the outlet passage is reached, thus, where the controlled fluid is gaseous, avoiding appreciable expansion of the flowing fluid in the valve body during its movement from the valve seat to the outlet passage, and maintaining its velocity of flow and kinetic energy substantially constant during said movement, which action most effectively holds the disk of the check valve in its fully opened position. This contributes to the elimination of back pressure by holding the valve disk in its position of least resistance to the flowing fluid.

Second, where check valves of either type are provided with a dash pot construction, including a cylindrical bore in the valve body and opening into the interior thereof, and a piston connected with the valve disk and movable in said cylindrical bore in accordance with movement of the valve disk, the invention provides a closure means for the cylindrical bore, carried by the piston and between it and the valve disk, which closure means, when said valve disk is fully open, closes the cylindrical bore at the interior of the valve body, thereby providing for the smooth and undisturbed flow of fluid across the then closed end of the cylindrical bore, and avoiding the production of eddying currents in the flowing fluid adjacent said closed end of the cylindrical bore.

Said closure means for the inner end of said cylindrical bore may include a tubular and cylindrical structure of substantially the same outer diameter as the dash pot piston, and closed at its inner or lower end, or alternatively of spaced metal disks carried by a rigid member connecting the dash pot piston with the valve disk and having the same outer diameter as said piston, which disks may either be flat or slightly conical or dished, as preferred; the said closure means is positively engaged by the flowing fluid, the relatively high velocity of which positively moves said closure means to its cylinder closing position and positively holds said closure means in that position and at the same time holds the valve disk in its fully opened position, thereby reducing to a negligible amount, the back pressure adjacent the inner end of the cylindrical bore.

The invention is applicable to any kinds of valves having valve disks movable as described, for example, check valves, stop and check valves, and stop valves, as well as to valves of the angle type and straight run type, and, in fact, to any valves of this class, whatever the relation of the inlet and outlet passages to each other, may be.

Figure 10:
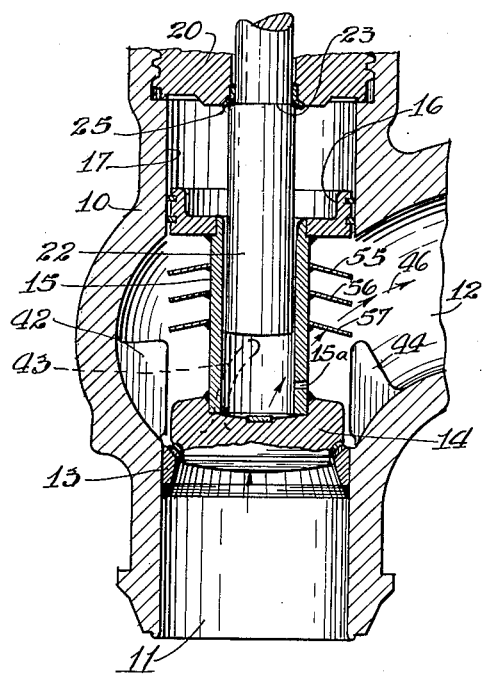

My invention will be best understood by reference to the accompanying drawings illustrating a preferred embodiment thereof, in which Fig. 1 shows in vertical, central, sectional view, a valve structure having four guiding ribs for the valve disk, Fig. 2 is a horizontal, sectional view through the structure, taken along the line 2—2 in Fig. 1, Fig. 3 is a horizontal, sectional view through a part of the structure of Fig. 1, taken along the line 3—3 in Fig. 1, Fig. 4 is a vertical view to an enlarged scale, of a part of the structure shown in Fig. 3, taken along the line 4—4 in Fig. 3, Fig. 5 is a horizontal, sectional view to an enlarged scale, of a part of the structure shown in Fig. 1, taken along the line 5—5 in Fig. 1, Fig. 6 shows in a view similar to Fig. 1, a part of a valve structure having three guiding ribs for the valve disk, Fig. 7 is a horizontal, sectional view, of a part of the structure shown in Fig. 6, taken along the line 7—7 in Fig. 6, Fig. 8 is a vertical view to an enlarged scale of a part of the structure shown in Fig. 7, taken along the line 8—8 in Fig. 7, and Figs. 9 and 10 show in fragmental views similar to Fig. 1, modified constructions of closure means for the inner or lower ends of the dash pot cylinders, the valve constructions of these figures being otherwise the same as shown in Figs. 1 to 5 inclusive.

Similar numerals refer to similar parts throughout the several views.

As shown in Fig. 1, an angle valve is illustrated which includes a body 10 having an inlet passage 11 and an outlet passage 12. Between said passages and extending horizontally across the path of flow through said body from said inlet passage to said outlet passage, said body is provided with an annular valve seat 13 for engagement by a valve disk 14 when the valve is in closed condition, said disk as shown being movable vertically away from said seat to open the valve, and being movable in the reverse direction from its open position, to close the valve. The valve disk 14 has a smoothly contoured convex surface and is connected with the lower end of a tube 15 extending upwardly and connected at its upper end with a piston 16 movable vertically in a cylindrical bore 17 formed in the upper portion of the body 10. The upper end of the body 10 is provided with internal threads 18 of relatively large pitch and of a form affording substantial strength, which threads engage similar external threads 19 formed on the outer surface of a bonnet 20 so that when the bonnet is tightly screwed into the body with the lower end of the bonnet pressing tightly against a shoulder formed therefor in the body, and the said parts are connected by welding material 21 as indicated, a tight joint is formed between the body and the bonnet preventing fluid leakage from within the body through said joint, as described in U. S. Letters Patent #2,261,269, dated November 4, 1941. The piston 16 is preferably provided with suitable piston rings to effect a dash pot action in the bore 17, and the tube 15 is provided near its lower end, with a pressure-equalizing aperture 15a.

As shown in Fig. 1, the piston 16 includes a tubular member carrying the piston rings referred to, connected with the tube 15 by ring members 16a and 16b by suitable welding material as indicated, the piston 16 being so located on the tube 15 that said piston is in the upper end of the bore 17 when the valve disk 14 is in its fully opened position, at which time the ring member 16b closes the lower end of the bore 17, with the lower surface of said member 16b substantially in the plane of the lower end of said bore. The ring member 16b is provided with an aperture 16c for pressure equalization and drainage purposes.

The valve structure thus far described, comprises a check valve permitting free flow from the inlet passage 11 to the outlet passage 12, and preventing flow through the body 10 in the reverse direction. The quickness of response of the valve disk 14 to flow changes, is determined by the size of the aperture 15a, so that a suitably cushioned action of the valve disk may be secured for any particular operating conditions.

As shown in Fig. 1, the valve structure also includes a valve stem 22 having at its lower portion, a diameter somewhat less than the inner diameter of the tube 15, which stem extends upwardly through the bonnet 20 for engagement with suitable operating mechanism as below described. Below the bonnet 20, the stem 22 is provided with a shoulder 23 above which the stem 22 continues with a substantially smaller diameter to the top of the valve structure. The lower portion of the bonnet 20 is provided with a bore somewhat larger than the stem 22, which bore at its upper and lower end portions is provided preferably by welding, with suitable bearings 24 and 25 having finished inner surfaces affording a desired fit with the stem 22, the lower bearing 25 also serving as a seat for the shoulder 23 when the stem 22 is in its uppermost position, to prevent leakage through the bonnet 20.

Above the bearing ring 24, the bonnet 20 is provided with an enlarged bore around the stem 22, containing packing rings 26 of suitable material, held in compressed condition by a gland 27 pressed downwardly by a gland flange 28 by means of gland studs 29 (see Fig. 2) and nuts thereon, said studs being secured at their lower ends, to said bonnet.

Above the bonnet 20, the stem 22 extends through a tubular yoke 30 preferably of formed sheet metal or seamless tubing, which yoke is secured at its lower end to said bonnet, for example, by welding, and at its upper end has secured thereto, for example, by welding, a metal block 31 supporting the outer members of ball bearings 32 and 33, the inner members of which are secured to a yoke bushing 34 having threaded engagement with the upper end portion of the stem 22.

Above the bearing 33, the bushing 34 has rigidly secured thereto by a key 35, a cross arm 36 the ends of which are in the paths of movement of lugs 37 carried by a handwheel 38, which handwheel is supported for free turning movement excepting as limited by the cross arm 36, on a bushing 39 threaded externally on the upper end of the bushing 34, the bushing 39 being rigidly secured against relative turning movement, to the hub of the cross arm 36 by suitable screws as indicated. The upper end of the bushing 34 is enclosed by a cap 40 having threaded engagement with said bushing, said cap serving to hold the handwheel 38 in place on its supporting bushing 39.

The handwheel 38 is of the impactor type, for imparting greater axial thrust to the stem 22 than could be produced if the handwheel were rigidly secured to the bushing 34.

The yoke 30 is provided with opposite openings 30b, 30b in line with the gland studs 29, 29 (see Fig. 2), to permit ready access to the nuts on said studs for adjustment of the gland 27.

Below the yoke bushing 34, the stem 22 has rigidly secured thereto by a key and set screw as indicated, a guide collar 41 having a radial arm 41a which extends into a slot 30a therefor in the yoke 30, which slot prevents rotation of the stem 22 relatively to the yoke and at the same time permits axial movement of the stem.

The described construction of the stem 22 and its operating mechanism, provides a means for positively holding the valve disk 14 against the valve seat 13 for any fluid pressure that may exist in the inlet passage 11, by moving the stem 22 downwards into forcible engagement with the seated valve disk 14. This permits changes and repairs of any desired kind in the piping connected with the outlet passage 12, without changing in any way the fluid pressure that has been and is continuing to be exerted in the inlet passage 11. The entire valve structure above described, thus constitutes a stop and check valve construction.

Valve constructions of the kind above described are frequently required to withstand high operating pressure, for example, 300 pounds per square inch, or more, and also high temperatures, for example, 500° F., or higher, and such valves are frequently required to be of large size. In practice, in connection with such valves, high velocities of fluid flow occur through the valve bodies, which make it desirable to provide guiding devices for the valve disks to insure accurate seating of said valve disks on their seats when the valves are closed. Such guiding devices are necessarily located in the flow streams through the valves, and such guiding devices heretofore used have been open to the serious objection that they seriously impede fluid flow through the valves and set up substantial back pressures in the flow streams. Included in the purpose of the invention, is an improved construction of valve disk guiding devices, that minimizes said objection, as below described.

As shown in Figs. 1 and 3, the body 10 is provided just above the valve seat 13, with four guiding ribs 42, 43, 44 and 45 which extend radially and inwardly from the body 10 towards the axis of the valve disk 14, and are provided with inner guiding edge surfaces which are portions of a cylindrical surface of substantially the same diameter as the outer diameter of the valve disk 14 and coaxial with said valve disk, so that said valve disk may move freely vertically between said ribs and be guided by them, said cylindrical surface being also coaxial with the seating surface of the valve seat 13 to insure accurate guiding of said valve disk to said valve seat. Said guiding ribs also maintain said coaxial relation between said valve disk and said valve seat, when the valve disk is raised from the valve seat, thereby maintaining the moving parts connected with the valve disk in most efficient operating relation to the stationary parts of the valve structure with which said moving parts cooperate.

As shown in Fig. 3, the guiding ribs 42, 43, 44 and 45 are angularly spaced from each other, the ribs 42 and 44 being in a vertical plane through the axis of the valve disk 14, which may be regarded as the plane of the curved flow stream from above the valve disk 14 to the outlet passage 12 when the valve disk 14 is in its open position. In view of this, the ribs 42 and 44 are substantially vertical and straight, the pressures of the flowing fluid on the side surfaces of the rib 42 being substantially equal to each other, as is also the case for the rib 44, since the side surfaces of said ribs 42 and 44 do not linearly extend across the path of flow of the fluid moving through the valve. The rib 43, however, if it were vertical and straight, would have its side surfaces linearly extending across the said path of fluid flow, and the engagement of the flowing fluid with the side surface of the rib would materially impede the flow and set up a corresponding back pressure. To prevent this, the rib 43, although it is substantially radial relatively to the disk axis throughout the height of said rib, is given a vertical curvature substantially corresponding to the curvature of the flow stream at the location of said rib which is induced by the contoured bottom surface of the valve disk when in open position, as more clearly shown in Figs. 3 and 4, as a result of which the edge guiding surface of the rib is somewhat helical in form around the disk axis. The said edge guiding surface is not a true helix, however, since, as indicated in Fig. 4, the lower portion of the rib 43 is substantially vertical, then curved in the direction of the flow stream, the amount of the curvature of the rib being first slight, and then progressively greater and greater, until at its upper edge the curvature substantially corresponds with the curvature of the flow stream at that point, thereby avoiding the setting up of conflicting cross currents in the flowing fluid adjacent the upper edge of the rib. The general effect of the rib 43 is to impart movement to the flowing fluid engaging it, in the curved path indicated by the broken line 46 in Fig. 1, it being borne in mind that the resultant path of flow beyond the rib 43 is determined in part by the fluid flowing over said rib. The construction and operation of the guiding rib 45 are similar to the construction and operation of the guiding rib 43, bearing in mind that the ribs 43 and 45 are on opposite sides of the flow stream and curved along substantially parallel lines from the valve seat 13 toward the outlet 12.

It will be observed that with the valve disk 14 in its open position, the flowing fluid must pass around the edge of said disk, as a result of which a substantial amount of said fluid will engage the guiding edge surface of each of the guiding ribs, and then divide and proceed along the opposite side surfaces of said rib. To minimize the flow friction thus involved, each of the four guiding ribs is given a radial formation as shown for the rib 42 in Fig. 5, where the thickness of the rib is progressively decreased from its guiding edge surface to the body of the valve, each of said ribs being similarly decreased in thickness from its lower portion to its upper edge, thereby giving said ribs a streamlined conformation in the direction of fluid flow along the side surfaces of said ribs.

Although the guiding ribs 42 and 44 are substantially vertical and straight, and so do not tend to impart a curved direction of flow to the fluid stream, they have the important function of maintaining the portions of the fluid stream engaging them, in their proper planes of flow, thereby avoiding the setting up of cross currents and corresponding back pressure.

As shown in Fig. 1, the valve seat 13 has a substantially smaller internal diameter, than the inlet passage 11 which correspondingly increases the velocity of the fluid stream as it flows through the valve seat, said increase in velocity being gradual due to the tapered bore of the valve seat member to avoid the development of undue back pressure, and producing a Venturi effect. The interior of the valve body 10, contains a passage connecting the inlet passage 11 with the outlet passage 12, which connecting passage together with the bottom surface of valve disk 14 and guide ribs 43 and 45 is formed to gradually and without abrupt change of direction, impart a curved flow to the fluid stream along the path indicated by the broken line 46, and to also provide a cross-sectional area for the path of flow from the valve seat 13 to the outlet passage 12, that is substantially uniform, so that the increased velocity imparted to the flowing fluid at the valve seat 13 is maintained substantially without change throughout said connecting passage and until the outlet passage 12 is reached. This increased velocity of flow positively moves the valve disk 14 and piston 16 to their uppermost position, by the engagement of the moving fluid with said disk and the ring member 16b, and where the fluid is gaseous, expansion of said fluid in its movement from the valve seat 13 to the outlet passage 12, is avoided, and the fluid flows through the valve body 10 with a minimum of drop in pressure.

In the manner described, the efficient flow of the fluid through the valve body 10 is effected by the cooperative action of, first, the Venturi action at the valve seat increasing the velocity of fluid flow through the valve body, and the contoured bottom surface of valve disk 14, second, the action of the straight guiding ribs 42 and 44 in maintaining the flow of the fluid engaging them, in parallel paths without cross-currents of flow, third, the action of the curved guiding ribs 43 and 45 in smoothly directing the fluid engaged by them, along a curved path of flow of the fluid towards the outlet passage 12, and in discharging said engaged fluid towards said outlet passage, fourth, the construction and form of the interior of the valve body 10, which provides a smoothly curved path of flow from the valve seat 13 to the outlet passage 12, and fifth, the described structure carried by the dash pot piston rod which closes the lower end of the dash pot bore 17 in a manner to smoothly continue the inner flow-directing surface of the valve body 10 substantially without interruption, and without obstructions capable of producing cross flow and eddying currents in the stream of fluid flowing through the valve body 10.

In Fig. 6 a modified valve construction is shown, including a valve body 10a, a bonnet 20a, a valve seat 13a, a valve disk 14a, and a valve stem 22a, similar to the corresponding parts shown and described in connection with Fig. 1, excepting that the valve stem 22a is connected with the valve disk 14a by a shouldered sleeve 47 threaded into said valve disk and a split ring 48 in a groove therefor in the lower portion of the valve stem, as a result of which the valve disk 14a moves axially with the valve stem 22a when said valve stem is raised and lowered. The valve construction shown in Fig. 6 thus constitutes a stop valve instead of a stop and check valve, the piston 16 shown in Fig. 1 being omitted.

As more clearly shown in Fig. 7, the construction of Fig. 6 is provided with three guiding ribs 49, 50 and 51, for the valve disk 14a, which are found to be sufficient for many purposes, which guiding ribs are of a construction and operate in a manner similar to the guiding ribs 42, 43, 44 and 45 as shown in Fig. 3, the only differences being that the guiding rib 42 is not used in the construction of Fig. 6, that the guiding ribs of Fig. 7 are more widely spaced angularly from each other than are the guiding ribs of Fig. 3, and that the curvature of the guiding ribs 49 and 51 is somewhat different from the curvature of the guiding ribs 43 and 45 of Fig. 3.

The guiding rib 50 is located substantially in the plane of the flow stream through the valve body 10a, said rib is substantially straight vertically, and it is constructed and operates in the same manner as the guiding rib 44 shown in Figs. 1 and 3. The guiding rib 49 because of its location in the flow stream, has a curvature axially of the valve disk 14a (see Fig. 8) which, combined with the action of the fluid flowing over said guiding rib, directs the fluid engaged by the side surface of said rib along the path of flow through the valve body 10a, indicated by the broken line 46a in Fig. 6. The guiding rib 51 located in the side of the flow stream opposite to that in which the guiding rib 49 is located, has the same construction as the guiding rib 49, and its effect on the flowing fluid engaging it is the same as that described for the guiding rib 49. The guiding ribs 49, 50 and 51 have cylindrical edge guiding surfaces of substantial extent angularly and are of progressively reduced thickness towards the valve body 10a, and also towards the upper edges of said ribs, producing a streamline flow of fluid across the side surfaces of said ribs.

With the construction of Fig. 6, the stem 22a is of reduced diameter above a shoulder 23a located at such a distance above the valve disk 14a, that when the valve is fully opened, said shoulder seats against a bearing surface 25a carried by the lower end of the bonnet 20a, thereby preventing leakage of the fluid in the valve casing, between the bonnet and the valve stem for that condition of the valve. With the construction of Fig. 1, the shoulder 23 is so located on the valve stem 22, that when said shoulder is seated against the bearing surface 25, the lower end of said stem is sufficiently spaced from the valve disk 14, to permit said valve disk to move freely to its fully opened position, when functioning as a non-return or check valve.

The parts not shown in Fig. 6 and required to make a complete valve structure, are the same as shown and described in connection with Fig. 1.

It will be noted that, in each of the above described constructions, the curved valve guiding and fluid flow directing ribs extend axially from the valve seat for a major portion of the distance to a horizontal plane containing the axis of the outlet passage and that the contoured bottom surface of the valve disk when in open position, intersects the upper ends of said ribs. As the valve disk perpihery is tangent to the ingress end of the outlet passage, the fluid entering the connecting passage at high velocity is immediately directed into the outlet passage by the combined flow diverting influence of the convex valve surface and the concave surfaces of the guide ribs along a curvilinear path substantially parallel to the ingress end of said passage. Thus the formation of eddy currents and back pressure in the connecting passage is reduced to a minimum.

In Figs. 9 and 10, I illustrate alternate forms of means for closing the lower end of the cylindrical bore 17, which may be used instead of the cylindrical closure means shown in Fig. 1. In Fig. 9, the tube 15 has secured thereto below the piston 16, for example, by welding, flat circular disks 52, 53 and 54 of sheet metal which are spaced from said piston and from each other, and which are disposed in planes perpendicular to the axis of the tube 15, the lowermost disk 54 being so located that when the piston 16 and valve disk 14 are in their uppermost positions, the lower surface of said disk 54 is substantially in the plane of the lower end of the cylindrical bore 17.

The disks 52, 53 and 54 are of substantially the same outer diameter as the piston 16. With this construction, when the valve disk 14 is raised by the fluid stream flowing through the valve seat 13, said stream engages said disks 52, 53 and 54 successively during the lifting of the valve disk, until the valve disk is in its uppermost position for most efficient flow of the fluid stream around it, said lifting action being particularly effective because of the Venturi action and increased velocity of the fluid flow through the valve body, above described in connection with Fig. 1. When the valve disk 14 is in its uppermost position, the disk 54 effectively closes the lower end of the cylindrical bore 17, with all of the advantages above described in connection with the closure means shown in Fig. 1. The closure means shown in Fig. 9 has the additional advantage, that in any case where the velocity of the flow stream is not sufficient to fully move the valve disk 14 to its uppermost position, the lifting effort then exerted on the valve disk is maintained by the effective engagement of the flow stream with one or more of the disks 52, 53 and 54, also that the spaces between said disks then provide paths of low resistance for the flowing fluid between the ones of said disks that may be below the lower end of the cylindrical bore 17, and that for that position of the valve disk, either the disk 52 or the disk 53, as the case may be, may constitute a closure means for the lower end of said bore.

The closure means illustrated in Fig. 10, is similar to that shown in Fig. 9, the difference being that the disks 55, 56 and 57 shown as secured to the tube 15, are dished or conical and have surfaces diverging downwardly, instead of being flat as described for the disks 52, 53 and 54. In other respects, the disks 55, 56 and 57 are similarly disposed on the tube 15 and operate in a similar manner and with similar results, to the disks 52, 53 and 54 described in connection with Fig. 9. The disks 55, 56 and 57 have the advantages over the disks 52, 53 and 54, of greater stiffness and greater resistance to deformation, and in addition, their lower concave surfaces afford somewhat more effective engagement with the fluid flowing through the valve body. To secure these advantages, it is found that the disks 55, 56 and 57 may have large apex angles, for example, 170°, so they do not depart greatly from the form of the flat disks 52, 53 and 54.

In other respects than described, the complete valve construction of each of Figs. 9 and 10, is the same as shown and described in connection with Fig. 1.

It will be noted that the improved valve construction described, is applicable to any valve construction including a valve disk operating as described, whether the valve construction is of the plain check or non-return type, or of the stop and check type, or of the stop type. It will also be apparent that said improved valve construction is applicable in the manner described, whatever may be the relation to each other of the inlet and outlet passages of the valve body, that is to say, said passages may be at an angle of substantially ninety degrees to each other as illustrated, or at any other preferred angle, or said passages may be parallel or in alignment with each other as required for any particular uses.

The improved valve construction has been found to substantially reduce the drop in fluid pressure through the valve body, when compared with the drop in pressure under similar conditions, experienced with other known valve constructions, thereby materially improving the efficiency of transmission of fluid under pressure through piping systems including the improved valve structures.

While I have shown my invention in the particular embodiments above described, I do not limit myself thereto as I may employ equivalents thereof without departing from the scope of the appended claims.

What I claim is:

1. A valve comprising a body having inlet and outlet passages and a connecting passage between said inlet and outlet passages that is smoothly curved and free from abrupt change of direction and free from back-pressure producing obstruction, said valve body having a valve seat between said inlet and connecting passages of an inner diameter gradually constricted in the direction of fluid flow therethrough whereby the velocity of flow through said connecting passage is substantially greater than the velocity of flow of said fluid in said inlet passage, a valve disk movable axially from and towards said valve seat, a dash pot structure carried by said valve body including a cylindrical bore opening into said connecting passage and a piston in said cylindrical bore and a rigid member connecting said piston with said valve disk, and closure means comprising axially spaced disks secured to and extending laterally from said rigid member and having outer diameters substantially equal to the outer diameter of said piston, each of said closure disks having a surface adapted to closely adjoin the surface of said connecting passage when said valve disk is in an open position.

2. A valve comprising a body having inlet and outlet passages and a connecting passage between said inlet and outlet passages that is smoothly curved and free from abrupt change of direction and free from back-pressure producing obstruction, said valve body having a valve seat between said inlet passages and its connecting passage of an inner diameter gradually constricted in the direction of fluid flow therethrough whereby the velocity of flow through said connecting passage is substantially greater than the velocity of flow of said fluid in said inlet passage, a valve disk movable axially from and towards said valve seat, a dash pot structure carried by said valve body including a cylindrical bore opening into said connecting passage and a piston in said cylindrical bore and a rigid member connecting said piston with said valve disk, and closure means comprising axially spaced disks secured to and extending laterally from said rigid member and having outer diameters substantially equal to the outer diameter of said piston, each of said closure disks having a concave surface smoothly continuing the surface of said connecting passage when said valve disk is in an open position.

3. In a valve construction, the combination of a valve body having inlet and outlet passages and a connecting passage between said inlet and outlet passages, a valve seat between said inlet passage and said connecting passage, a valve disk movable axially from and towards said valve seat, a dash pot structure carried by said valve body including a cylindrical bore opening into said connecting passage and a piston in said cylindrical bore and a member rigidly connecting said piston with said valve disk, and closure means comprising axially spaced disks secured to and extending laterally from said rigid member and having outer diameters substantially equal to the outer diameter of said piston, each of said disks adapted to close the inner end of said bore and having a surface continuing the surface of said connecting passage when said valve disk is in an open position.

4. In a valve construction, the combination of a valve body having inlet and outlet passages and a connecting passage between said inlet and outlet passages, a valve seat between said inlet passage and said connecting passage, a valve disk movable axially from and towards said valve seat, a dash pot structure carried by said valve body including a cylindrical bore opening into said connecting passage and a piston in said cylindrical bore and a member rigidly connecting said piston with said valve disk, and closure means comprising axially spaced concavo-convex disks secured to and extending laterally from said rigid member and having outer diameters substantially equal to the outer diameter of said piston, each of said disks having a concave surface continuing the surface of said connecting passage when said valve disk is in an open position.

5. In a valve construction, a body having inlet and outlet passages, a valve seat between said passages and a bore in opposed coaxial relation with said valve seat, a valve axially movable to and from said seat and movable to open position under fluid pressure, a piston rigidly connected with said valve and movable in said bore, when the valve is opened, to a position in spaced relation from the inner open end of the bore, and additional means connected with said valve for unitary movement therewith and operative to effectively close said open end of the bore when the valve is in its open position.

6. A valve construction as defined in claim 5, wherein said additional means comprises a plurality of closure elements selectively operable to close said bore in response to relatively different fluid pressures.

DAVID MacGREGOR.

REFERENCES CITED

The following references are of record in the file of this patent:

UNITED STATES PATENTS

| Number | Name | Date |
|---|---|---|
| 571,612 | Eichhorn | Nov. 17, 1896 |
| 867,341 | Blesch | Oct. 1, 1907 |
| 875,873 | Watrous | Jan. 7, 1908 |
| 954,178 | Fowler | Apr. 5, 1910 |
| 968,916 | Benner | Aug. 30, 1910 |
| 1,195,429 | Acton | Aug. 22, 1916 |
| 1,710,214 | Hassold | Apr. 23, 1929 |
| 1,825,378 | Wilson | Sept. 29, 1931 |
| 2,097,698 | Mohr | Nov. 2, 1937 |
| 2,225,872 | Langmyhr | Dec. 24, 1940 |
| 2,269,404 | Haven | Jan. 6, 1942 |
| 2,299,074 | Bereny | Oct. 20, 1942 |

FOREIGN PATENTS

| Number | Country | Date |
|---|---|---|
| 294,278 | Italy | of 1932 |